May 3, 1966 R. L. CARLÉE 3,249,463
ACRYLIC LATEX COATING COMPOSITION AND BOOK
COVER MATERIAL MADE THEREFROM
Filed Sept. 21, 1962
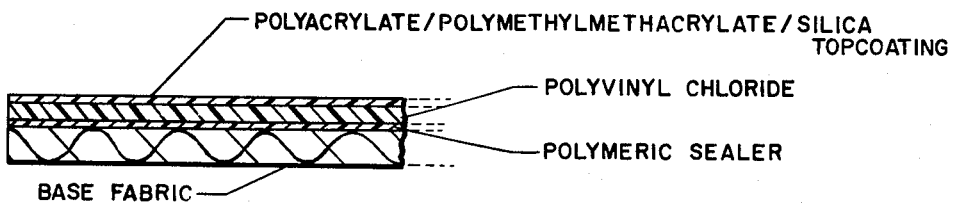
*INVENTOR.*
ROBERT L. CARLÉE 3,249,463
ACRYLIC LATEX COATING COMPOSITION AND
BOOK COVER MATERIAL MADE THEREFROM
Robert L. Carlée, North Leeds, Maine, assignor to Interchemical Corporation, New York, N.Y., a corporation of Ohio
Filed Sept. 21, 1962, Ser. No. 225,355
8 Claims. (Cl. 117—76)

This invention relates to aqueous topcoating compositions for coated fabrics and to articles made therefrom.

For many years there has been considerable demand for a (vinyl-) coated fabric that has good adhesion, back to face, with hot animal glue. Besides this property, it is often also desirable that such a fabric should have good stretch and set properties, such that it can be drawn around corners without typical vinyl rebound. Ordinary vinyl is rubbery and tends to pull back.

This invention provides fabrics fulfilling all these requirements and in addition is well adapted to current production methods where hot animal glue is used. The coated article may be imprinted, hot stamped, and hot-die embossed.

One embodiment of this invention comprises (1) a base fabric, (2) a first coating to seal the pores of the fabric and act as a barrier coat; this should not contain migratory plasticizers such as dioctyl phthalate, (3) a polyvinyl chloride plastisol coating made with suitable polymeric plasticizers to give good set and stretch characteristics and limit migration, and (4) an acrylic latex top coating preferably containing finely-divided silica of large surface area, the latex having substantial crosslinking properties, the cured coating being hard enough so that it is not tacky or at most only slightly tacky, but on the other hand not of such hardness that it is harsh and brittle. Coatings that are too hard form bonds with hot animal glue that display little strength.

The latex should preferably contain a wetting agent, such as Aerosol OT. A useful amount was found to be about 1 gram of the solid wetting agent in 100 grams of latex. It is conveniently added in the form of a 10% aqueous solution. The quantity must be such that the substrate is efficiently wetted by the latex. This prevents crawling when the latex is coated on a normally hydrophobic surface. It also aids in rendering the finished top coating hydrophilic.

The silica is preferably finely divided and should have a surface area of at least 50 square meters per gram, preferably 200–400 square meters per gram. The addition of up to about 25% by weight based on resin solids, to the top coating latex imparts surprisingly improved properties to the finished coating. When hot animal glue is applied to the cured top coating, the adhesive bond is greatly strengthened when such a silica has been incorporated in the top coat composition. The final luster of the surface varies somewhat with the amount of silica used. Silica also aids in providing slippage for hot die embossing.

It is desirable to provide some type of thickener for the latex so that normal coating operations are feasible. If the composition is to be applied while on the acid side, various conventional thickeners are suitable, sodium carboxy methyl cellulose for example. The simplest method of attaining the desired viscosity, however, is to use resin emulsions which thicken when the pH value is brought to the neutral or alkaline range.

The coated fabric of this invention provides a valuable improvement over pyroxylin coated fabrics used for covering industrial cases, such as, for portable phonographs, and book covers. A comparison of products of similar grade, that is, having similar base fabrics, equal thickness of coating, etc. gave the results described below.

The coated fabric of this invention out-performed the pyroxylin coated fabrics about 10 to 1 on a Du Pont scrub tester and better than 8 to 1 on a flex tester. Pyroxylin burns rapidly while these new coatings are slow burning. The new fabrics display durability and low fire hazard and they can be handled on existing production lines now using pyroxylin coated fabrics. They also permit some new design effects not possible with pyroxylin.

Peel strength was tested by cutting 2 inch strips of the finished, embossed fabric and gluing them back to front with hot animal glue at 135–140° F. Three days later the glued samples were peeled down with a Scott tensile machine and the pounds of pull required noted. All samples were prepared at approximately the same time, using the same vinyl coated fabric on which the top coating was applied, fused and embossed in one run, and tested together.

The hardness of films formed from cured blends of Rhoplex B–86 and Rhoplex B–15 were determined. The results are given below:

| Weight Percent B–86 Latex | Weight Percent B–15 Latex | Tukon Hardness, KHN |
|---|---|---|
| 70 | 30 | 6.7 |
| 65 | 35 | 5.5 |
| 60 | 40 | 4.5 |
| 55 | 45 | 3.6 |
| 50 | 50 | 2.8 |
| 45 | 55 | 2.2 |
| 40 | 60 | 1.8 |
| 35 | 65 | 1.5 |

For the embodiments of this invention the Tukon hardness, KHN range of about 6.7 to about 1.5 are operable, while the range from about 2.2 to about 3.6 is particularly valuable.

A description of the Tukon microhardness test will be found on pages 365–6 of the Kirk-Othmer "Encyclopedia of Chemical Technology," vol. 7, New York (1951).

Example 1

| | Parts by weight |
|---|---|
| Rhoplex B–15 Latex | 40 |
| Rhoplex B–86 Latex | 60 |
| 10% Aerosol OT | 6 |
| Syloid 244 | 4 |
| Water | 20 |

Ammonia to bring the pH to 7.

Example 2

| | |
|---|---|
| Rhoplex B–15 Latex | 45 |
| Rhoplex B–86 Latex | 55 |
| 10% Aerosol OT | 6 |
| Syloid 244 | 4 |
| Water | 20 |

Ammonia to bring the pH to 7.

Book case covers were made according to this invention using the top coating compositions of either Example 1 or Example 2. A finished book case cover is shown schematically, in cross section, in the drawing where the various coatings are shown, but not necessarily to scale. Strips glued back to front with hot animal glue were peeled down after 4 days. A 4-pound pull was required.

Other examples were made up similarly, but using a single commercial latex in each one rather than a blend. The products were evaluated, with the following results.

| Latex | Peel Strength in lbs. | Remarks on Cured Coating |
|---|---|---|
| Rhoplex B-25 | 0.5 | Tacky. |
| Rhoplex B-10 | 1.0 | Do. |
| Rhoplex C-72 | 0.5 | OK. |
| Rhoplex B-15 | 1.5 | Slightly tacky. |
| Rhoplex B-86 | 2.0 | Brittle. |
| Rhoplex AC-200 | 2.5 | OK. |
| Rhoplex B-60A | 1.0 | Tacky. |

These examples were repeated, omitting the silica. The results are given below:

| Latex | Peel Strength in lbs. | Remarks on Cured Coating |
|---|---|---|
| Rhoplex B-25 | 0.5 | Very tacky. |
| Rhoplex B-10 | 0.5 | Do. |
| Rhoplex C-72 | 0.5 | OK. |
| Rhoplex B-15 | 0.5 | Tacky. |
| Rhoplex B-86 | 2.0 | Brittle. |
| Rhoplex AC-200 | 1.5 | OK. |
| Rhoplex B-60A | 0.5 | Very tacky. |

Example 2 was then repeated, but varying the silica used. The results were:

| | Peel Strength | Remarks |
|---|---|---|
| Syloid 244 | 3.5 | OK. |
| Syloid 308 | 2.0 | Very slightly tacky. |
| Cab-O-Sil M-5 | 2.5 | Slightly tacky. |
| Santocel C | 2.0 | Do. |

As a sealer or barrier coating for the fabric, excellent results were obtained with a modified Rhoplex AC-33 acrylic latex with no plasticizer. Other compositions are also effective, provided they are substantially free from migratory plasticizers, such as dioctyl phthalate. When paper is used as the substrate, a sealer coating is not required.

A blend of 70 parts Rhoplex B-86 and 30 parts Rhoplex B-10 was found to be equivalent to a blend of 60 parts Rhoplex B-86 and 40 parts Rhoplex B-15. Similarly Amberlac-165 could be substituted for Rhoplex B-86. For example good results were obtained with a blend of 40 parts Amberlac-165 and 60 parts Rhoplex B-15. It is also possible to add a crosslinking agent, such as Aerotex Resin M-3, a melamine compound. This increases the reactivity of the system, Rhoplex B-15 or the like will cure harder and therefore the proportion of such a soft reactive resin to the hard unreactive resin should be increased to end up in the desired hardness range. Rhoplex AC-200 or Rhoplex AC-201 may be substituted for Rhoplex B-86.

The higher ranges of silica content aid in hot die embossing operations performed in subsequent operations, particularly those run at high speed with a relatively hot die. Polyvinyl chloride coatings have a strong tendency to adhere to a hot die. In effect the top coatings of this invention make it possible to apply high speed hot stamping and hot die embossing to vinyl surfaces. The silica also aids materially in silk screening or printing operations, providing a surface into which the ink can bite, thus producing excellent ink adhesion to surfaces which would otherwise reject the ink. The coating itself is a relatively effective barrier coating to plasticizer migration, and ink "resoftening" is thereby prevented.

The amount of wetting agent varies with the type of surface to be coated. Generally 1% Aerosol OT gives good results, but on oily substrates as much as 2% may be needed. Other efficient wetting agents may be used, such as Triton X-100.

In applying the coating, considerable leeway is possible. It can, for example, be knife-coated on a continuous web and heated at 250° F. for 2 to 3 minutes to drive off the moisture and cause the ingredients to react. It can also be dried, subsequently fused at 375° F. for ½ minute, and then the entire assembly embossed with a grain if desired. Except for producing the desired luster, the appearance of the original surface is not visibly altered. The top coating bonds to the substrate and appears to become a part of it. Similar results are displayed when the top coating is applied over printed surfaces. The top coating composition is preferably applied in the amount of 4 to 20 pounds, wet basis, per 150 square yards of coated fabric. Less than this does not cover properly; while more produces too brittle a film.

Ammonia added to bring the pH to 7, in the cases of acrylics like Rhoplex B-15, is effective in providing the viscosity up to values convenient for the coating operations. When dispersions are used that do not display this type of thickening, then various conventional thickeners may be used, for instance carboxymethyl cellulose.

Aerosol OT is dioctyl sodium sulfosuccinate.

Rhoplex B-15 is a latex consisting of 46% by weight of an aqueous dispersion of a relatively soft reactive acrylic terpolymer which is predominantly ethyl acrylate, containing minor amounts of methyl acrylate and acrylic acid. The molecular weight of the polymer is greater than $2 \times 10^6$. The pH value of this latex is 6.0 to 6.8.

Rhoplex B-86 is a latex consisting of 32% by weight of an aqueous dispersion of an extremely hard acrylic resin, essentially polymethylmethacrylate, and 14% by weight of a volatile plasticizer suitable for polymethylmethacrylate.

Syloid 244 is a silica, aerogel type, having a surface area of 300 square meters per gram and a particle size, before milling, of 3.3 microns.

Syloid 308 is a silica having a surface area of 230 square meters per gram and a particle size before milling of 7 microns.

Cab-O-Sil is an anhydrous silica having a surface area of 200±25 square meters per gram and a particle size of .015 to .020 micron.

Santocel C is a silica, aerogel type, having a surface area of 130 square meters per gram and a particle size before milling of 0.3 to 0.5 micron.

Rhoplex AC-200 is a thermosetting ("B stage") hard, reactive acrylic resin dispersed in an aqueous medium to form a latex containing 46% by weight of solids and has a pH value of 9-10. The polymer has a built-in, self-crosslinking mechanism and has greater crosslinking capacity than any other of the "Rhoplexes." Rhoplex AC-201 is similar.

Rhoplex B-10 is a latex similar to B-15 but the reactive polymer is softer.

Rhoplex B-25 is also a soft acrylic resin in latex form. The pH is 9.0 and the solids content is 46%.

Rhoplex 60A is a latex of a soft, unreactive acrylic resin, essentially ethyl acrylate modified with other acrylates or methacrylates. Its molecular weight is $1.25 \times 10^6$.

Rhoplex AC-33 is an aqueous dispersion of a soft unreactive acrylic resin consisting essentially of ethyl acrylate and is similar to Rhoplex B-60A.

Amberlac-165 is the ammonia salt of a synthetic resin complex. The resin is reactive and very hard.

Rhoplex C-72 is an acrylic polymer latex that yields hard, tough films. The Tukon hardness, KHN is 4.3. A blend of 33% Rhoplex B-15 and 66% of Rhoplex C-72 has a Tukon hardness, KHN of 0.98; a blend of 66% Rhoplex B-15 and 33% of Rhoplex C-72 has a Tukon hardness, KHN of 0.62.

In the expression "Tukon hardness, KHN," KHN means Knoop hardness number.

What is claimed is:
1. A coating composition comprising a blend of:
(a) 30–65% by weight of a latex containing about 46% by weight of an aqueous dispersion of a relatively soft reactive acrylic terpolymer which is predominantly ethyl acrylate, containing minor amounts of methyl acrylate and acrylic acid having substantial crosslinking properties and
(b) correspondingly 70–35% by weight of a latex containing about 32% by weight of an aqueous dispersion of an extremely hard acrylic resin consisting essentially of polymethylmethacrylate and about 14% by weight of a volatile plasticizer suitable for said hard resin,
(c) said blend being further characterized by the fact that, when cured without adjuvants, it yields a film having a Tukon hardness, KHN of from about 6.7 to about 1.5, and
(d) from about 10.4% by weight to about 25% by weight, based on resin solids, of a finely divided silica having a surface area of at least 50 square meters per gram.

2. A coating composition according to claim 1, further characterized by the presence of a wetting agent.

3. A coated fabric having the cured composition of claim 1 as a top coating.

4. A coated fabric having the cured composition of claim 2 as a top coating.

5. A book cover material comprising
(a) a base fabric having
(b) a coating firmly bonded to one of its sides comprising a polymeric sealer substantially free from migratory plasticizer,
(c) a coating firmly bonded to the polymeric sealer and made from a polyvinyl chloride plastisol containing plasticizers that are substantially polymeric only, and
(d) a crosslinked top coating firmly bonded to said polyvinyl chloride coating and made from an acrylic latex, substantially neutral, comprising a blend of:
(1) 30–65% by weight of a latex consisting essentially of an aqueous dispersion of a relatively soft acrylic terpolymer which is predominantly ethyl acrylate, containing minor amounts of methyl acrylate and acrylic acid of high molecular weight and having substantial crosslinking properties and
(2) correspondingly 70–35% by weight of a latex comprising about 32% by weight of an aqueous dispersion of an extremely hard acrylic resin consisting essentially of polymethylmethacrylate and about 14% by weight of a volatile plasticizer suitable for said hard acrylic resin
(3) said latex blend being further characterized by the fact that when cured without adjuvants, it yields a film having a Tukon hardness, KHN of from about 6.7 to 1.5, and
(4) from about 10.4% by weight to about 25% by weight, based on resin solids, of a finely-divided silica having a surface area of at least 50 square meters per gram.

6. A book cover material according to claim 5 wherein the acrylic latex is restricted to a blend of 45–55% by weight of said latex of soft acrylic interpolymer and, correspondingly 55–45% by weight of said latex of hard acrylic resin.

7. A book cover material according to claim 5 wherein the acrylic latex is further characterized by the presence of a wetting agent.

8. A book cover material according to claim 6 wherein the acrylic latex is further characterized by the presence of a wetting agent.

References Cited by the Examiner
UNITED STATES PATENTS

| | | | |
|---|---|---|---|
| 2,069,983 | 2/1937 | Ubben | 260—45.5 |
| 2,123,474 | 7/1938 | Redman | 260—45.5 |
| 2,169,558 | 8/1939 | Dittmar | 260—45.5 |
| 2,754,280 | 7/1956 | Brown et al. | 117—161 |
| 2,770,566 | 11/1956 | Ritter | 117—76 |
| 2,792,321 | 5/1957 | Fredericks | 117—76 |
| 2,892,804 | 6/1959 | Crissey | 117—161 |
| 2,947,716 | 8/1960 | Cornell et al. | 260—45.5 |

OTHER REFERENCES

Kadesch, Modern Plastics, May 1959, 117–PO A, pp. 148–149.

RICHARD D. NEVIUS, *Primary Examiner.*

WILLIAM D. MARTIN, *Examiner.*

R. S. KENDALL, *Assistant Examiner.*